United States Patent
Green et al.

(10) Patent No.: US 9,303,812 B2
(45) Date of Patent: *Apr. 5, 2016

(54) ADJUSTABLE HANGER BAR FOR LUMINAIRES

(71) Applicant: Cooper Technologies Company, Houston, TX (US)

(72) Inventors: Russell Green, Douglasville, GA (US); Terence Clarke, Roswell, GA (US); Grzegorz Wronski, Peachtree City, GA (US); Huang Rongxiu, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,997

(22) Filed: Dec. 22, 2014

(65) Prior Publication Data

US 2015/0131271 A1    May 14, 2015

Related U.S. Application Data

(63) Continuation of application No. 14/242,540, filed on Apr. 1, 2014, now Pat. No. 8,939,418.

(60) Provisional application No. 61/809,171, filed on Apr. 5, 2013.

(51) Int. Cl.
| | |
|---|---|
| *B42F 13/00* | (2006.01) |
| *F16M 13/02* | (2006.01) |
| *F21V 21/04* | (2006.01) |
| *F21V 21/22* | (2006.01) |
| *F21S 8/02* | (2006.01) |

(52) U.S. Cl.
CPC .............. *F16M 13/022* (2013.01); *F21S 8/026* (2013.01); *F21V 21/048* (2013.01); *F21V 21/22* (2013.01); *F21S 8/02* (2013.01)

(58) Field of Classification Search
USPC .................... 248/342, 343, 344, 906, 200.1; 362/364, 365, 366, 147
See application file for complete search history.

(56) References Cited

U.S. PATENT DOCUMENTS

| | | |
|---|---|---|
| 1,156,885 A | 10/1915 | Caine |
| 1,350,295 A | 8/1920 | Champeau |

(Continued)

OTHER PUBLICATIONS

Halo Lighting "Edison Recessed Lighting" Cooper Industries No. ADV 693025 Jan. 1984.
"Edison Lighting" ET 7001 P Cooper Industries 694917 Sep. 1989.
"Edison Lighting" ET 7070 ET 7071 ET7301 ET7401 ET 7410 Cooper Industries 694979 Dec. 1987.
Sears Owner's Manual Model No. 9 89575 694954 Oct. 1987.
Halo H-7T H-27T H-71CT H274 H275 Bar Hanger Installation Instruction 695876 Jun. 1989.

(Continued)

*Primary Examiner* — Steven Marsh
(74) *Attorney, Agent, or Firm* — King & Spalding LLP

(57) ABSTRACT

A hanger bar assembly includes a first hanger bar member that includes a first rail segment. The first hanger bar member also includes a first channel segment that includes a first channel. The first hanger bar member also includes a first transitional middle segment extending between the first rail segment and the first channel segment. The hanger bar assembly further includes a second hanger bar member that includes a second rail segment. The second rail segment is positioned in the first channel of the first channel segment. The second hanger bar member further includes a second channel segment that includes a second channel. The first rail segment is positioned in the second channel. The second hanger bar member also includes a second transitional middle segment extending between the second rail segment and the second channel segment.

20 Claims, 20 Drawing Sheets

(56) References Cited

U.S. PATENT DOCUMENTS

| | | |
|---|---|---|
| 1,622,087 A | 3/1927 | Calderwood |
| 1,756,361 A | 4/1930 | Johnson |
| 1,791,480 A | 2/1931 | Smith et al. |
| 1,821,733 A | 9/1931 | Thibodeau |
| 2,316,389 A | 4/1943 | Atkinson |
| 2,518,515 A | 8/1950 | Austin |
| 2,658,241 A | 11/1953 | Houghton et al. |
| 2,713,983 A | 7/1955 | Kay |
| 2,802,933 A | 8/1957 | Broadwin |
| 2,887,568 A | 5/1959 | Franck |
| 2,930,564 A | 3/1960 | Maier |
| 2,933,549 A | 4/1960 | Antonucci |
| 3,040,172 A | 6/1962 | Chan |
| 3,099,404 A | 7/1963 | Kaufman et al. |
| 3,102,306 A | 9/1963 | Hutchinson |
| 3,104,087 A | 9/1963 | Budnick et al. |
| 3,154,001 A | 10/1964 | Zurawski |
| 3,162,413 A | 12/1964 | Hexdall |
| 3,300,634 A | 1/1967 | Libreman |
| 3,313,931 A | 4/1967 | Kugman |
| 3,597,889 A | 8/1971 | Nigro |
| 3,609,338 A | 9/1971 | Kripp |
| 3,710,096 A | 1/1973 | McFarlin |
| 4,022,415 A | 5/1977 | Roderick et al. |
| 4,040,589 A | 8/1977 | McLay |
| 4,041,657 A | 8/1977 | Schuplin |
| 4,086,480 A | 4/1978 | Lahm |
| 4,114,327 A | 9/1978 | Williams |
| 4,122,762 A | 10/1978 | Williams |
| 4,149,693 A | 4/1979 | LoNigro |
| 4,165,851 A | 8/1979 | Bowden et al. |
| 4,190,355 A | 2/1980 | Avery et al. |
| 4,230,900 A | 10/1980 | Speet |
| 4,290,098 A | 9/1981 | Pierson |
| 4,336,575 A | 6/1982 | Gilman |
| 4,388,677 A | 6/1983 | Druffel |
| 4,391,428 A | 7/1983 | Grimes |
| 4,406,216 A | 9/1983 | Hott et al. |
| 4,408,262 A | 10/1983 | Kusmer |
| 4,475,147 A | 10/1984 | Kristofek |
| 4,511,113 A | 4/1985 | Druffel et al. |
| 4,519,019 A | 5/1985 | Hall |
| 4,545,000 A | 10/1985 | Fraley et al. |
| 4,564,888 A | 1/1986 | Lewin et al. |
| 4,566,057 A | 1/1986 | Druffel |
| 4,569,003 A | 2/1986 | Elmer et al. |
| 4,577,824 A | 3/1986 | Druffel et al. |
| 4,646,212 A | 2/1987 | Florence |
| 4,670,822 A | 6/1987 | Baker |
| 4,723,747 A | 2/1988 | Karp et al. |
| 4,729,080 A | 3/1988 | Fremont et al. |
| 4,742,440 A | 5/1988 | Guzzini |
| 4,754,377 A | 6/1988 | Wenman |
| 4,757,967 A | 7/1988 | Delmore et al. |
| 4,760,510 A | 7/1988 | Lahti |
| 4,760,981 A | 8/1988 | Hodges |
| 4,762,162 A | 8/1988 | Chochrek |
| 4,796,169 A | 1/1989 | Shemitz |
| 4,803,603 A | 2/1989 | Carson |
| 4,829,410 A | 5/1989 | Patel |
| 4,872,097 A | 10/1989 | Miller |
| 4,930,054 A | 5/1990 | Krebs |
| 4,967,990 A | 11/1990 | Rinderer |
| 4,972,339 A | 11/1990 | Gabrius |
| 4,978,092 A | 12/1990 | Nattel |
| 5,029,794 A | 7/1991 | Wolfe |
| 5,034,867 A | 7/1991 | Mayer |
| 5,044,582 A | 9/1991 | Walters |
| 5,045,985 A | 9/1991 | Russo et al. |
| 5,057,979 A | 10/1991 | Carson et al. |
| 5,073,845 A | 12/1991 | Aubrey |
| 5,074,515 A | 12/1991 | Carter, Jr. |
| 5,075,828 A | 12/1991 | Gordin et al. |
| 5,075,831 A | 12/1991 | Stringer et al. |
| 5,130,913 A | 7/1992 | David |
| 5,176,345 A | 1/1993 | Medlin |
| 5,178,503 A | 1/1993 | Losada |
| 5,209,444 A | 5/1993 | Rinderer |
| 5,222,800 A | 6/1993 | Chan et al. |
| 5,291,381 A | 3/1994 | Price |
| 5,316,254 A | 5/1994 | McCartha |
| D351,481 S | 10/1994 | Cole, Jr. |
| 5,374,812 A | 12/1994 | Chan et al. |
| 5,379,199 A | 1/1995 | Hirshenhorn et al. |
| 5,386,959 A | 2/1995 | Laughlin et al. |
| 5,452,816 A | 9/1995 | Chan et al. |
| 5,457,617 A | 10/1995 | Chan et al. |
| 5,505,419 A | 4/1996 | Gabrius |
| 5,571,256 A | 11/1996 | Good et al. |
| 5,581,448 A | 12/1996 | Harwood |
| 5,588,737 A | 12/1996 | Kusmer |
| 5,595,028 A | 1/1997 | Handzlik |
| 5,597,234 A | 1/1997 | Winkelhake |
| 5,618,017 A | 4/1997 | DeBoer |
| 5,619,263 A | 4/1997 | Laughlin et al. |
| 5,623,789 A | 4/1997 | Kidwell et al. |
| D384,431 S | 9/1997 | Bitton |
| 5,662,413 A | 9/1997 | Akiyama |
| 5,662,414 A | 9/1997 | Jennings et al. |
| 5,678,799 A | 10/1997 | Jorgensen et al. |
| 5,690,423 A | 11/1997 | Hentz et al. |
| 5,738,436 A | 4/1998 | Cummings et al. |
| 5,746,507 A | 5/1998 | Lee |
| 5,758,959 A | 6/1998 | Sieczkowski |
| 5,800,051 A | 9/1998 | Gampe et al. |
| 5,826,970 A | 10/1998 | Keller et al. |
| 5,845,886 A | 12/1998 | McCormick |
| 5,857,766 A | 1/1999 | Sieczkowski |
| 5,873,556 A | 2/1999 | Reiker |
| 5,934,631 A | 8/1999 | Becker et al. |
| 5,954,304 A | 9/1999 | Jorgensen |
| 5,957,573 A | 9/1999 | Wedekind et al. |
| 5,957,574 A | 9/1999 | Hentz et al. |
| 6,004,011 A | 12/1999 | Sieczkowski |
| 6,030,102 A | 2/2000 | Gromotka |
| 6,033,098 A | 3/2000 | Hentz et al. |
| 6,076,788 A | 6/2000 | Akiyama |
| 6,082,878 A | 7/2000 | Doubek et al. |
| 6,085,916 A | 7/2000 | Kovacevic et al. |
| 6,105,918 A | 8/2000 | Gromotka |
| 6,164,802 A | 12/2000 | Gromotka |
| 6,216,992 B1 | 4/2001 | Bisonaya et al. |
| 6,231,205 B1 | 5/2001 | Slesinger et al. |
| 6,286,265 B1 | 9/2001 | Rinderer |
| 6,296,211 B1 | 10/2001 | Snyder |
| 6,332,597 B1 | 12/2001 | Korcz et al. |
| 6,341,466 B1 | 1/2002 | Kehoe et al. |
| 6,345,800 B1 | 2/2002 | Herst et al. |
| 6,431,723 B1 | 8/2002 | Schubert et al. |
| 6,461,016 B1 | 10/2002 | Jamison et al. |
| 6,471,374 B1 | 10/2002 | Thomas et al. |
| 6,484,980 B2 | 11/2002 | Medlin, Sr. et al. |
| 6,505,960 B2 | 1/2003 | Schubert et al. |
| 6,519,791 B2 | 2/2003 | Randolph |
| 6,527,406 B1 | 3/2003 | Slesinger et al. |
| 6,609,690 B1 | 8/2003 | Davis |
| 6,637,705 B2 | 10/2003 | Sjoblom et al. |
| 6,688,069 B2 | 2/2004 | Zadeh |
| 6,691,968 B1 | 2/2004 | Tseng |
| 6,726,347 B2 | 4/2004 | Wronski |
| 6,805,916 B2 | 10/2004 | Cadieu et al. |
| 7,673,841 B2 | 3/2010 | Wronski |
| 7,735,795 B2 | 6/2010 | Wronski |
| 7,810,775 B2 | 10/2010 | Dal Ponte et al. |
| 7,832,889 B1 | 11/2010 | Cogliano |
| 7,896,529 B2 | 3/2011 | Wronski |
| 8,038,113 B2 | 10/2011 | Fryzek et al. |
| 8,177,176 B2 | 5/2012 | Nguyen et al. |
| 8,240,630 B2 | 8/2012 | Wronski |
| 8,622,361 B2 | 1/2014 | Wronski |
| 2005/0183344 A1 | 8/2005 | Ziobro et al. |
| 2005/0230589 A1 | 10/2005 | Wronski |
| 2005/0247842 A1 | 11/2005 | Wronski |

(56) References Cited

U.S. PATENT DOCUMENTS

2007/0012847 A1  1/2007  Tai
2007/0075206 A1  4/2007  Wright et al.
2007/0261881 A1  11/2007  Wronski

OTHER PUBLICATIONS

Halo H& Housing with Improved Plaster Frame Cooper Industries 692601 Jul. 1981.

Robert O. Parmley, P.E.; Standard Handbook of Fastening and Joining, Second Edition; McGraw-Hill Publishing; pp. 8-29 to 8-31, 1989.

ADJUSTABLE HANGER BAR FOR LUMINAIRES

PRIORITY CLAIM AND RELATED APPLICATIONS

The present application is a continuation of and claims priority to U.S. patent application Ser. No. 14/242,540, filed Apr. 1, 2014, and titled "ADJUSTABLE HANGER BAR FOR LUMINAIRES," which claims priority under 35 U.S.C. Section 119(e) to U.S. Provisional Patent Application No. 61/809,171, filed Apr. 5, 2013, and titled "Adjustable Hanger Bar For Luminaires," the entire contents of which are incorporated herein by reference.

The present application is also related to U.S. Pat. No. 7,673,841, titled "HANGAR BAR FOR RECESSED LUMINAIRES WITH INTEGRAL NAIL" and filed on Mar. 25, 2005, the entire content of which is incorporated herein by reference.

TECHNICAL FIELD

The present disclosure relates generally to lighting solutions, and more particularly to an adjustable hanger bar for mounting a luminaire on a support structure.

BACKGROUND

A luminaire (i.e., a light fixture) is typically a complete lighting unit consisting of one or more lamps, socket, and optical devices for distributing light. A recessed luminaire is an example of a luminaire that is installed behind a structure such as a ceiling. Recessed luminaires are used in both commercial and residential applications. For example, a recessed luminaire is typically mounted on support structures behind a ceiling wall that has an opening to allow light from the recessed luminaire to illuminate an area below the ceiling wall.

Various support systems have been employed to support recessed luminaires. For example, recessed luminaires are often suspended between support structures such as joists and T-bar structures. To illustrate, a recessed luminaire may be supported by hanger bars that extend between parallel support structures. Generally, hanger bars need to have adequate strength and rigidity to reliably support a recessed luminaire. Further, because the spacing between the support structures such as the joists of a ceiling structure may vary, adjustability of the lengths of hanger bars is desirable for easy installation as well as for compatibility with different support structures.

Improperly installed hanger bars can cause a recessed luminaire as well as the hanger bars supporting the recessed luminaire to detach and fall from support structures (e.g., parallel joists). Further, unintentional detachment of hanger bar members from each other can make installation of hanger bars difficult. Hanger bars that are easy to install save time and expense. Thus, adjustable hanger bars that simplify installation and reduce risk of improper installation are desirable.

SUMMARY

In general, the present disclosure relates to an adjustable hanger bar for mounting a luminaire on a support structure. In an example embodiment, a hanger bar assembly includes a first hanger bar member that includes a first rail segment. The first hanger bar member also includes a first channel segment that includes a first channel. The first hanger bar member also includes a first transitional middle segment extending between the first rail segment and the first channel segment. The first rail segment and the first channel segment are offset from each other with respect to a horizontal axis. The hanger bar assembly further includes a second hanger bar member that includes a second rail segment. The second rail segment is positioned in the first channel of the first channel segment. The second hanger bar member further includes a second channel segment that includes a second channel. The first rail segment is positioned in the second channel. The second hanger bar member also includes a second transitional middle segment extending between the second rail segment and the second channel segment. The second rail segment and the second channel segment are offset from each other with respect to the horizontal axis.

In another example embodiment, a hanger bar assembly includes a first hanger bar member that includes a first rail segment. The first hanger bar member further includes a first channel segment that includes a first channel. The first hanger bar member also includes a first transitional middle segment extending between the first rail segment and the first channel segment. The first rail segment and the first channel segment are offset from each other with respect to a horizontal axis. The hanger bar assembly further includes a second hanger bar member that includes a second rail segment. The second rail segment is designed to be positioned in the first channel of the first channel segment. The second hanger bar member further includes a second channel segment that includes a second channel. The first rail segment is designed to be positioned in the second channel. The second hanger bar member also includes a second transitional middle segment extending between the second rail segment and the second channel segment. The second rail segment and the second channel segment are offset from each other with respect to a horizontal axis.

In another example embodiment, a luminaire mounting structure for mounting a recessed luminaire that includes a first hanger bar assembly, a second hanger bar assembly, and a plaster frame. The first hanger bar assembly is attached to the plaster frame on a first side of the plaster frame. The second hanger bar assembly is attached to the plaster frame on a second side of the plaster frame opposite the first side. Each of the first hanger bar assembly and the second hanger bar assembly includes a first hanger bar member and a second hanger bar member. The first hanger bar member includes a first rail segment and a first channel segment that includes a first channel. The first hanger bar member further includes a first transitional middle segment extending between the first rail segment and the first channel segment. The first rail segment and the first channel segment are offset from each other with respect to a horizontal axis. The second hanger bar member includes a second rail segment, where the second rail segment is positioned in the first channel of the first channel segment. The second hanger bar member further includes a second channel segment that includes a second channel, where the first rail segment is positioned in the second channel. The second hanger bar member also includes a second transitional middle segment extending between the second rail segment and the second channel segment. The second rail segment and the second channel segment are offset from each other with respect to a horizontal axis.

These and other aspects, objects, features, and embodiments will be apparent from the following description and the claims.

BRIEF DESCRIPTION OF THE DRAWINGS

Reference will now be made to the accompanying drawings, which are not necessarily drawn to scale, and wherein.

Figure 1:
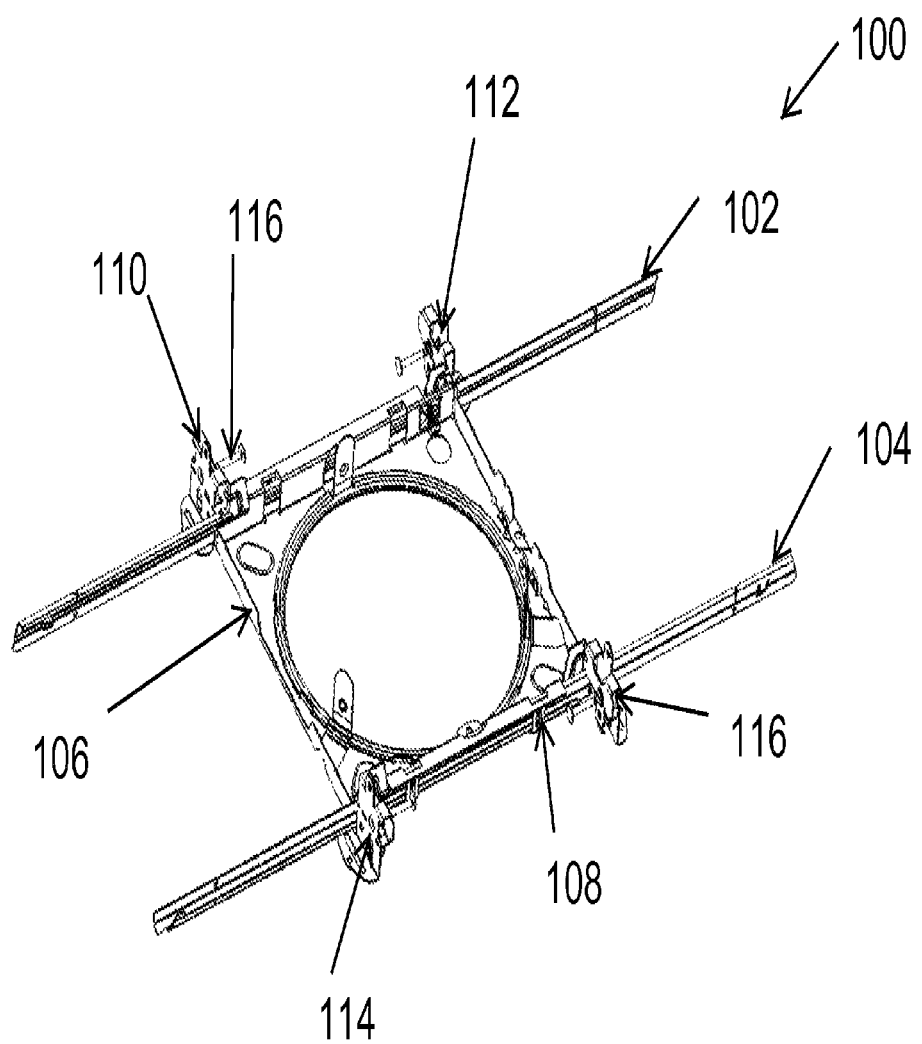
FIG. 1 illustrates a luminaire mounting structure including a pair of hanger bar assemblies attached to a plaster frame in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 5A:
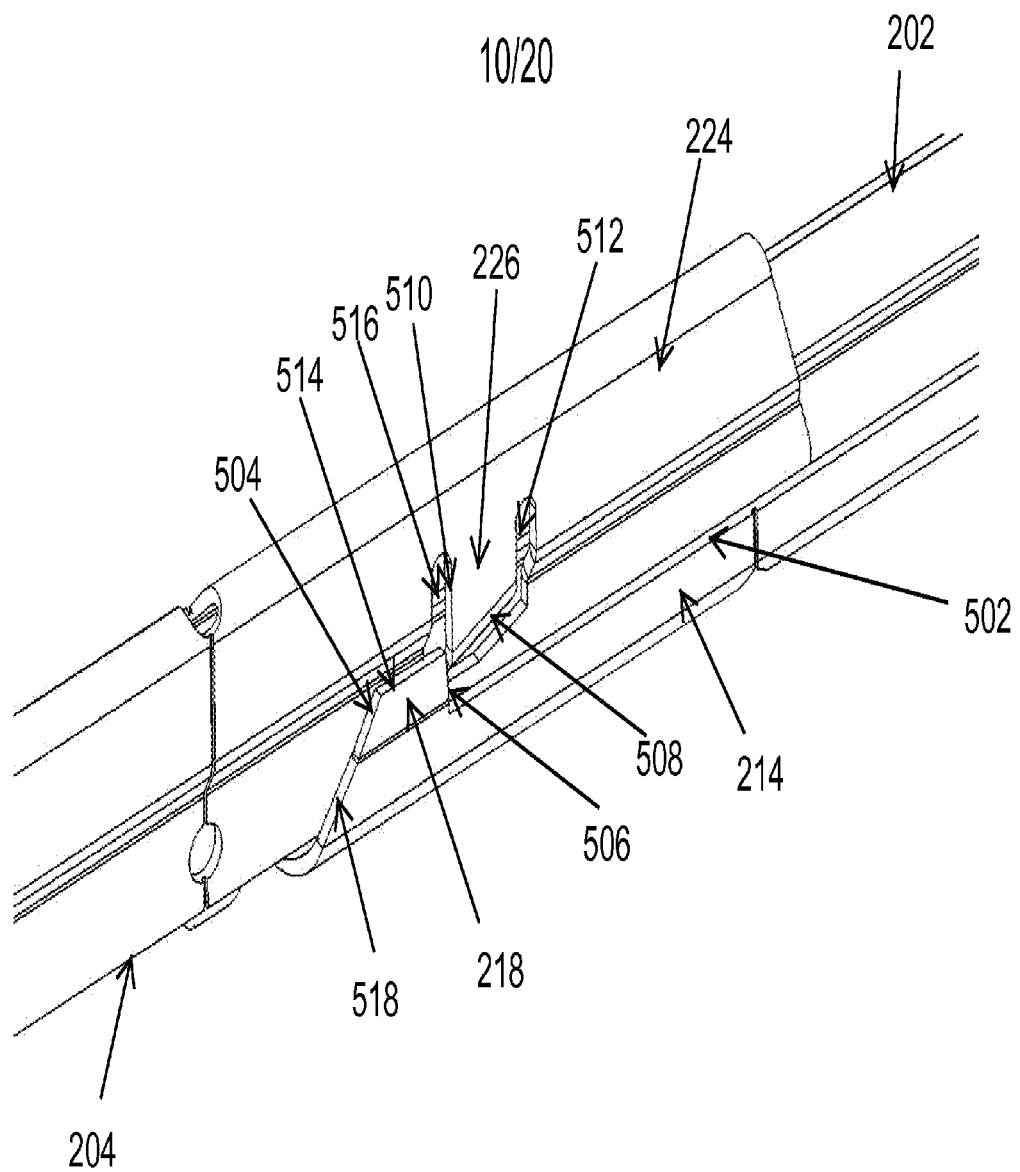
FIGS. 5A and 5B illustrate close-up views the stoppage tabs of the hanger bar assembly of FIG. 2 in accordance with another example embodiment.
Figure 5B:
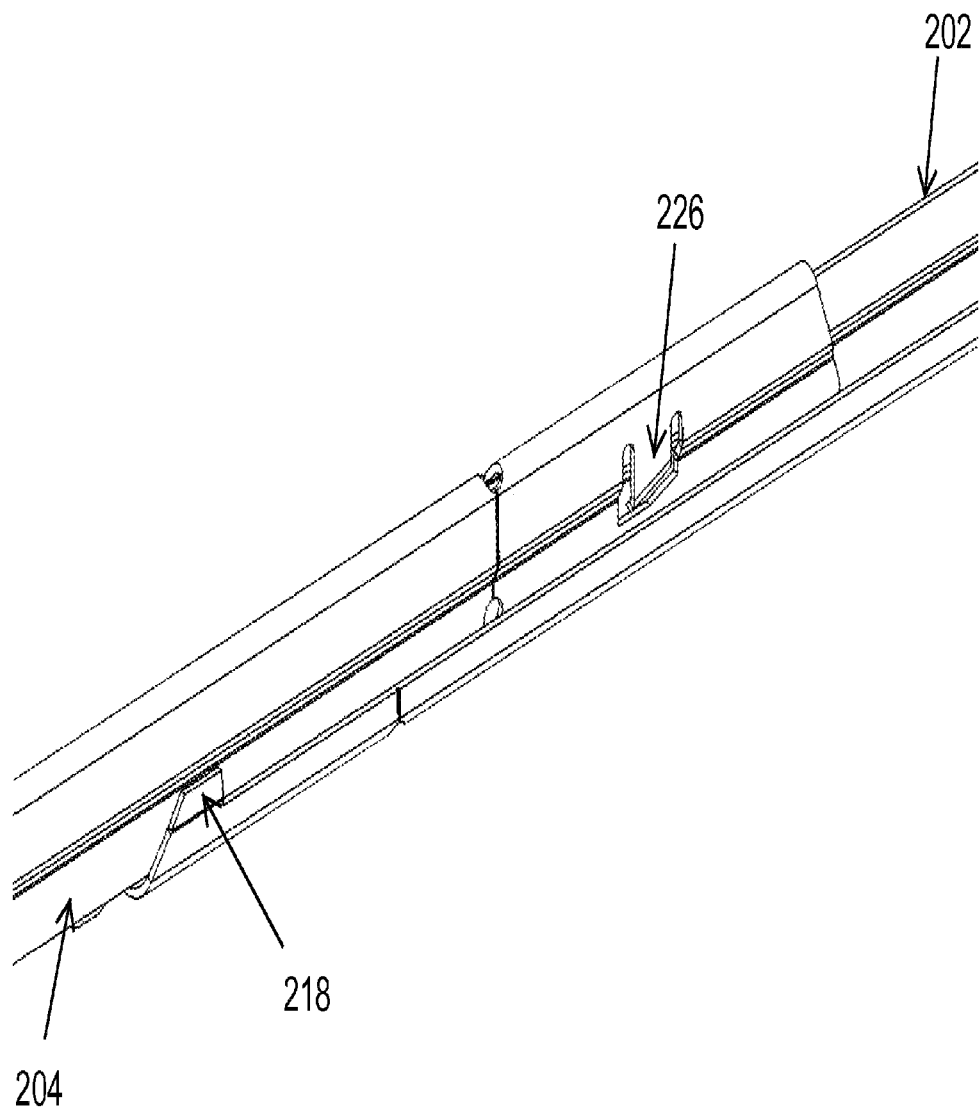
Figure 5C:
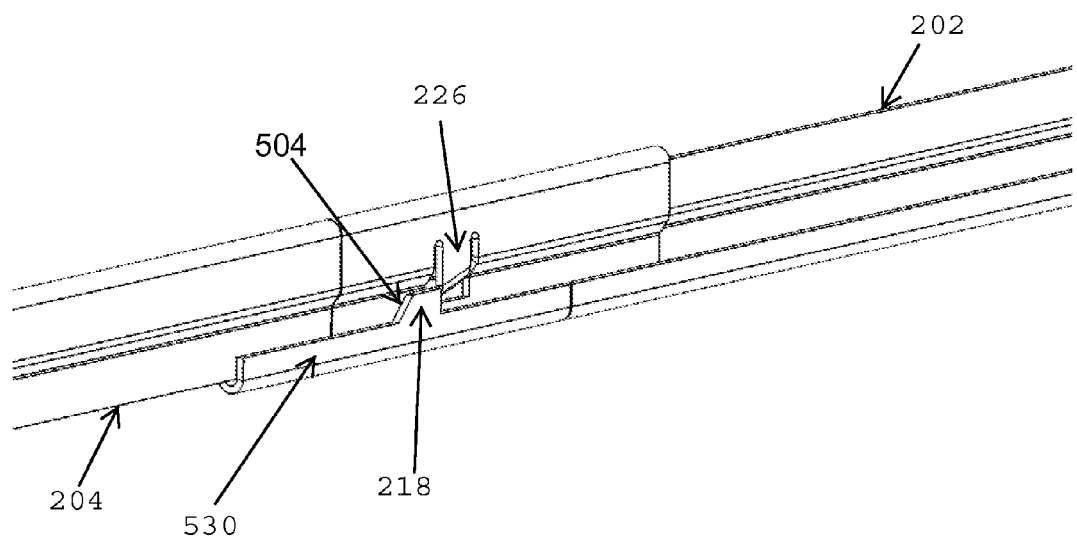
FIG. 5C illustrates a close-up view of stoppage tabs of the hanger bar assembly of FIG. 2 in accordance with another example embodiment.

Turning now to the figures, particular embodiments are described. FIG. 1 illustrates a luminaire mounting structure 100 including a pair of hanger bar assemblies attached to a plaster frame in accordance with an example embodiment. The luminaire mounting structure 100 includes a first hanger bar assembly 102 and a second hanger bar assembly 104. The first hanger bar assembly 102 and the second hanger bar assembly 104 are attached to a plaster frame 106 at opposite sides of the plaster frame 106. As illustrated in FIGS. 5A-C, a luminaire housing may be positioned on the plaster frame 106. Generally, the hanger bar assemblies 102 and 104 may be used to install a luminaire, such as a recessed luminaire, in a structure such as a ceiling. As described in more detail below, the first hanger bar assembly 102 and the second hanger bar assembly 104 are adjustable in length and can be used to install luminaires to structures that have different spacings between them.

In some example embodiments, the first hanger bar assembly 102 includes attachment structures 110 and 112. The attachment structures 110, 112 are designed to secure the hanger bar assembly 102 to a support structure, such as parallel joists, suspended ceiling T-grids, and/or steel framing. Similarly, in some example embodiments, the second hanger bar assembly 104 includes attachment structures 114 and 116. The attachment structures 114, 116 are designed to secure to a support structure, such as parallel joists, suspended ceiling T-grids, and/or steel framing. For example, each attachment structure 110, 112, 114, 116 may include a respective fastener 116 (e.g., a screw or nail) that may be used to secure the attachment structures to a support structure.

In an example embodiment, the first hanger bar assembly 102 and the second hanger bar assembly 104 are attached to the plaster frame 106 by one or more attachment tabs 108 on the sides of the plaster frame 106. For example, each of the one or more attachment tabs 108 may be elastic and movable to enable the hanger bar assembly 102 or 104 to be positioned between the respective tab 108 and the rest of the plaster frame 106 as illustrated in FIG. 1. In some example embodiments, each of the attachment tabs 108 may also be a loop that is, for example, integrally formed with the plaster frame 106.

Figure 2:
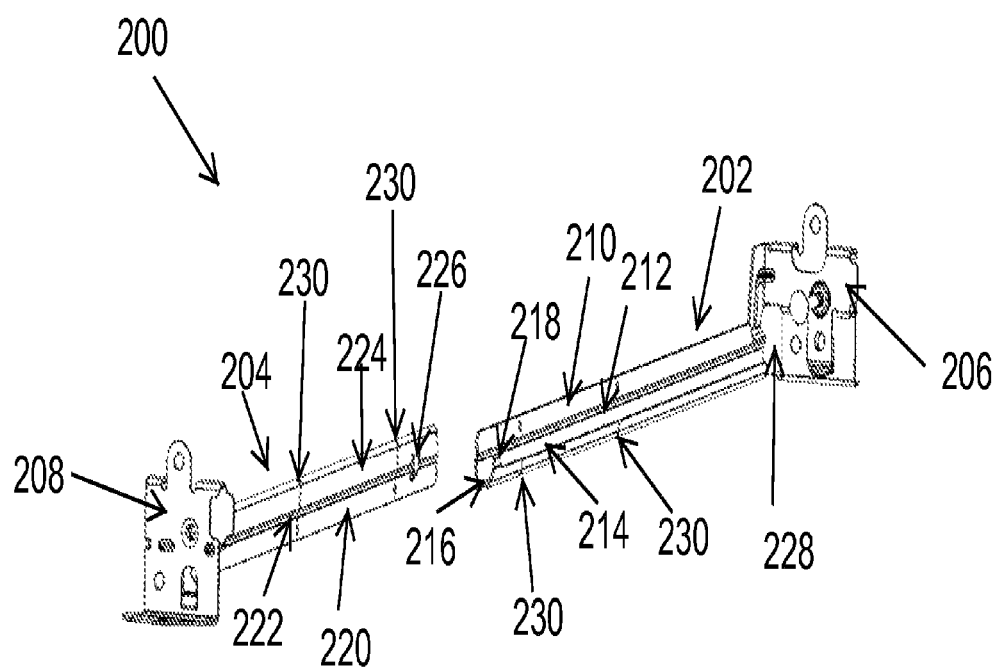
FIG. 2 illustrates a hanger bar assembly in accordance with an example embodiment.

FIG. 2 illustrates a hanger bar assembly 200 in accordance with an example embodiment. The hanger bar assembly 200 of FIG. 2 corresponds to the first hanger bar 102 and to the second hanger bar 104 of FIG. 1 and the description of the hanger bar assembly 200 equally applies to the first hanger bar 102 and to the second hanger bar 104. As illustrated in FIG. 2, the hanger bar assembly 200 includes a first hanger bar member 202 and a second hanger bar member 204. The first hanger bar member 202 and the second hanger bar member 204 may be interlocked with each other as illustrated, for example, in FIGS. 3A and 3B. Once the first hanger bar member 202 and the second hanger bar member 204 are interlocked, the hanger bar assembly 200 is freely adjustable lengthwise (i.e., longitudinally).

As illustrated in FIG. 2, the first hanger bar member 202 includes a rail segment 210, a transitional middle segment 212, and a channel segment 214. The transitional middle segment 212 extends between the rail segment 210 and the channel segment 214. For example, the transitional middle segment 212 may extend between the rail segment 210 and the channel segment 214 for substantially the entire length of the rail segment 210. Alternatively, the transitional middle segment 212 may extend between the rail segment 210 and the channel segment 214 for a portion of the rail segment 210 that is shorter than the entire length of the rail segment 210. As more clearly illustrated in FIGS. 3A-3C, the transitional middle segment 212 may be slanted relative to the rail segment 210 and relative to the channel segment 214. The channel segment 214 includes a channel 216, that, in some example embodiments, may extend for an entire length of the channel segment 214.

Figure 3A:
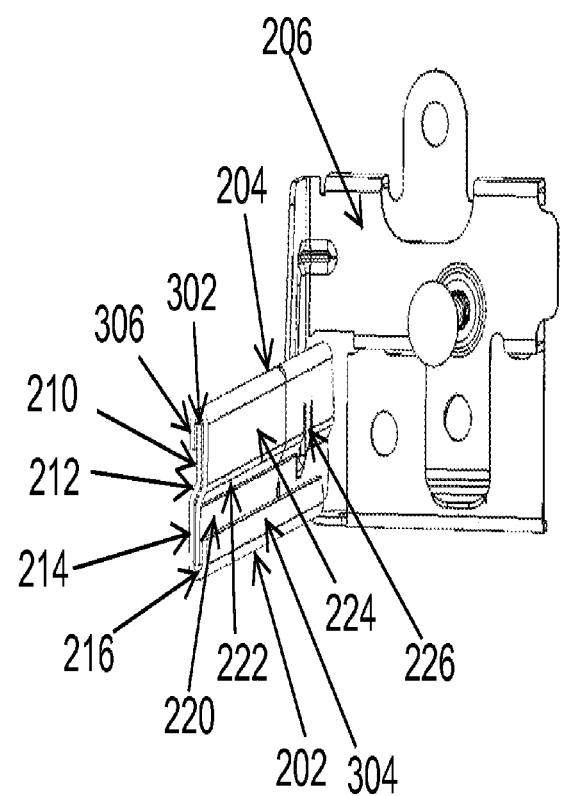
FIGS. 3A-3E illustrate cross-sectional views of the hanger bar assembly of FIG. 2 after the hanger bar members of the hanger bar assembly are interlocked in accordance with an example embodiment.

In some example embodiments, an attachment structure 206 is attached to the first hanger bar member 202 at an end of the hanger bar member 202. The attachment structure 206 may be integrally formed with the hanger bar member 202, or may be formed separately and attached to the hanger bar member 202 by a means such as welding or a fastener. The attachment structure 206 includes a gap 228 that allows a portion of the second hanger bar member 204 to extend past the attachment structure 206 when the first hanger bar member 202 and the second hanger bar member 204 are interlocked in a manner illustrated, for example, in FIG. 1. To illustrate, without the gap 228 in the attachment structure 206, the longitudinal movement of the second hanger bar member 204 that is interlocked with the first hanger bar member 202 as shown in FIG. 3A would be limited by the attachment structure 206 in one direction. Thus, the gap 228 allows the hanger bar assembly 200 to be adjusted to a shorter length than what would otherwise be possible. Other embodiments of the attachment structures 206, 208 that include a gap, such as the gap 228, are described in U.S. Pat. No. 7,673,841, the content of which is hereby incorporated herein. The adjustability of the hanger bar assembly 200 to a shorter length allows use of the hanger bar assembly 200 with support structures such as joists or T-bars that may have a narrow spacing between them.

As illustrated in FIG. 2, the second hanger bar member 204 includes a rail segment 220, a transitional middle segment 222, and a channel segment 224. The transitional middle segment 222 extends between the rail segment 220 and the channel segment 224. For example, the transitional middle segment 222 may extend between the rail segment 220 and the channel segment 224 for substantially the entire length of the rail segment 220. Alternatively, the transitional middle segment 212 may extend between the rail segment 210 and the channel segment 214 for a portion of the rail segment 210 that is shorter than the entire length of the rail segment 210. As more clearly illustrated in FIGS. 3A and 3B, the transitional middle segment 222 is slanted relative to the rail segment 220 and relative to the channel segment 224. The channel segment 224 includes a channel (the channel 302 illustrated in FIGS. 3A and 3B), that, in some example embodiments, may extend for an entire length of the channel segment 214.

In some example embodiments, an attachment structure 208 is attached to the hanger bar member 204 at an end of the hanger bar member 204. The attachment structure 208 may be integrally formed with the hanger bar member 204, or may be formed separately and attached to the hanger bar member 204 by a means such as welding or a fastener. Similar to the attachment structure 206, the attachment structure 208 includes a gap, similar to the gap 228 of the attachment structure 206, that allows a portion of the first hanger bar member 202 to extend therethrough and past attachment structure 208 when the first hanger bar member 202 and the second hanger bar member 204 are interlocked.

The first hanger bar member 202 and the second hanger bar member 204 may be interlocked by sliding the rail segment 210 of the first hanger bar member 202 into the channel in the channel segment 224 while sliding the rail segment 220 of the second hanger bar member 204 into the channel 216 of the channel segment 214. When the first hanger bar member 202 and the second hanger bar member 204 are interlocked, the rail segment 210 is positioned in the channel of the channel segment 224 of the second hanger bar member 204, and the rail segment 220 of the second hanger bar member 204 is positioned in the channel 216 of the channel segment 214 of the first hanger bar member 202.

Figure 3B:
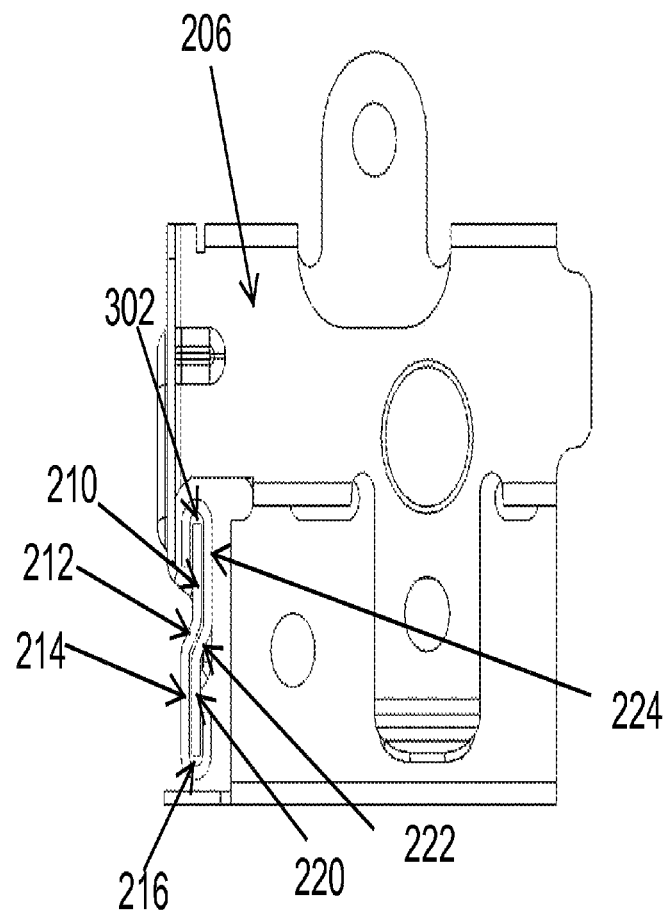

In some example embodiments, the first hanger bar member 202 includes a stoppage tab 218 that extends from an edge of the channel segment 214. The second hanger bar member 204 may include a stoppage tab 226 that extends, for example, from a wall of the channel segment 224. The stoppage tab 218 and the stoppage tab 226 may be dimensioned such that, once the first hanger bar member 202 and the second hanger bar member 204 are interlocked, the stoppage tab 218 and the stoppage tab 226 prevent or reduce the risk of unintended detachment of the first hanger bar member 202 and the second hanger bar member 204 from each other. Although the stoppage tab 218 and the stoppage tab 226 prevent or reduce the risk of unintended detachment of the first hanger bar member 202 and the second hanger bar member 204 from each other, one or both of the stoppage tab 218 and the stoppage tab 226 may be moved to intentionally detach the first hanger bar member 202 and the second hanger bar member 204 from each other. In some example embodiments, one or both of the stoppage tab 218 and the stoppage tab 226 may also be moved to slidably interlock the first hanger bar member 202 and the second hanger bar member 204 with each other as illustrated in FIGS. 3A and 3B. The stoppage tab 218 and the stoppage tab 226 may have spring-like response to a force that applied in a direction perpendicular the hanger bar members 202, 204. In some example embodiments, the hanger bar assembly 200 is made from sheet metal. For example, the sheet metal may be aluminum sheet metal. In alternative example embodiments, the sheet metal may be raw steel instead of aluminum. In some example embodiments, the first hanger bar member 202 and the second hanger bar member 204 may be made by extrusion of metal or other material(s) such as a composite material. Alternatively, the first hanger bar member 202 and the second hanger bar member 204 may be made by molding. The first hanger bar member 202 and the second hanger bar member 204 may be formed such that the hanger bar assembly 200 has the strength and rigidity adequate to support a luminaire such as a recessed luminaire or another kind of luminaire that may be supported by the hanger bar assembly 200.

In some example embodiments, the first hanger bar member 202 and the second hanger bar member 204 may include score lines 230. For example, after the first hanger bar member 202 and the second hanger bar member 204 are assembled as shown in FIG. 1, the hanger bar members 202, 204 may be cut, broken, or bent along a respective score line 230 to allow the hanger bar members 202, 204 to fit between joists.

Although FIG. 2 shows that the attachment structure 206 is attached to the first hanger bar member 202, and the attachment structure 208 is attached to the second hanger bar member 204, in alternative embodiments, the hanger bar assembly 200 may not include the attachment structures 206 and 208. Alternatively, the hanger bar assembly 200 may include attachment structures that are different from the attachment structures 206 and 208.

FIGS. 3A-3E illustrate cross-sectional views of the hanger bar assembly 200 of FIG. 2 after the hanger bar members 202, 204 of the hanger bar assembly 200 are interlocked with each other in accordance with an example embodiment. The first hanger bar member 202 and the second hanger bar member 204 are interlocked such that the rail segment 210 of the first hanger bar member 202 is positioned in the channel 302 of the second hanger bar member 204, and such that the rail segment 220 of the second hanger bar member 204 is positioned in the channel 216 of the first hanger bar member 202. As illustrated in FIGS. 3A and 3B, each of the channels 216 and 302 may be substantially U-shaped and is defined by walls of the respective channel segment 214 or 224. For example, the channel segment 214 has a wall 304 defining the channel 216 on a side of the channel segment 214. Similarly, the channel segment 224 has a wall 306 defining the channel 302 on a side of the channel segment 224. In some alternative example embodiments, the channels 216 and 302 may have shapes other than the substantially U-shape shown in FIGS. 3A and 3B. As illustrated in FIGS. 3A and 3B, the hanger bar members 202 and 204 are interlocked to each to form a substantially uniform solid structure having a general shape of a rectangular rod with rounded corners.

Figure 3C:
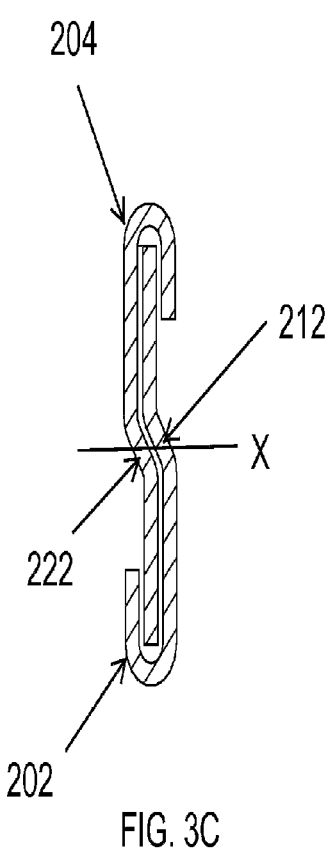

As illustrated in FIGS. 3A-3C (the attachment structure 206 is omitted from FIG. 3C for clarity of illustration), the transitional middle segment 212 may be slanted relative to the rail segment 210 and relative to the channel segment 214. Similarly, the transitional middle segment 222 may be slanted relative to the rail segment 220 and relative to the channel segment 224. In an example embodiment, the degree of slant of the transitional middle segment 212 relative to the rail segment 210 may be substantially the same as the degree of slant of the transitional middle segment 222 relative to the rail segment 220. For example, in the orientation of the hanger bar members 202, 204 shown in FIGS. 3A and 3B, the transitional middle segment 212 may be slanted approximately 45 degrees relative to a vertical axis extending down from the rail segment 210. Similarly, the transitional middle segment 222 may be slanted approximately 45 degrees relative to a vertical axis extending up from the rail segment 220 of the second hanger bar member 204. In an example embodiment, when the first hanger bar member 202 and the second hanger bar member 204 are interlocked as illustrated, the transitional middle segment 212 and the transitional middle segment 222 are substantially lined up to the extent that the first hanger bar member 202 and the second hanger bar member 204 overlap with each other. For example, a surface of the transitional middle segment 212 may be in contact with a surface of the transitional middle segment 222.

Figure 3E:
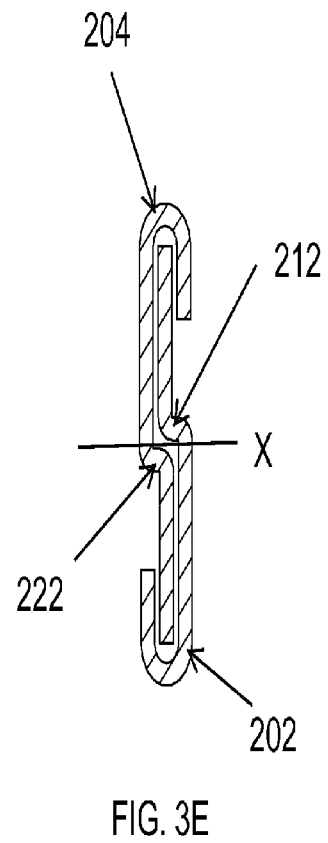
Figure 3D:
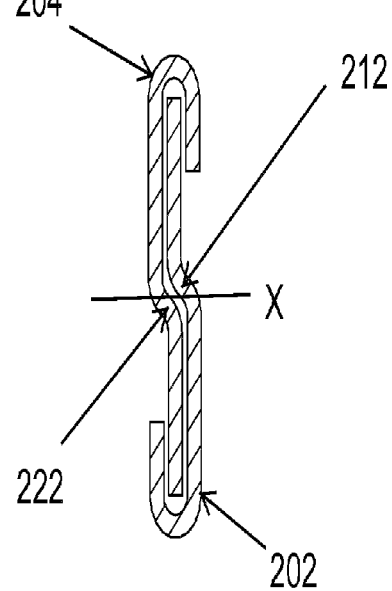

As illustrated in FIG. 3D, the transitional middle segment 212 and the transitional middle segment 222 may be curved instead of slanted. Alternatively, the transitional middle segment 212 and the transitional middle segment 222 may be substantially horizontal as illustrated in FIG. 3E. The rail segment 210 and the channel segment 214 of the first hanger bar member 202 are offset from each other with respect to a horizontal axis (X) shown in FIGS. 3C-3E. Similarly, the rail segment 220 and the channel segment 224 of the second hanger bar member 204 are offset from each other with respect to the horizontal axis (X). In some alternative embodiments, the transitional middle segment 212 and the transitional middle segment 222 may have cross-sectional shapes other than shown in FIGS. 3A-3C without departing from the scope of this disclosure.

As illustrated in FIGS. 3A and 3B, when the first hanger bar member 202 and the second hanger bar member 204 are interlocked with each other, the rail segment 210 of the first hanger bar member 202 is positioned adjacent to the channel segment 224 of the second hanger bar member 204, and the channel segment 214 of the first hanger bar member 202 is positioned adjacent to the rail segment 220 of the second hanger bar member 204.

The interlocked first hanger bar member 202 and second hanger bar member 204 are slidable relative to each other such that the hanger bar assembly 200 has an adjustable overall length. In an example embodiment, the second hanger bar member 204 may extend through the gap 228, and the first hanger bar member 202 may extend through a similar gap in the attachment structure 208 attached to an end of the second hanger bar member 204 as illustrated in FIG. 2.

Figure 4A:
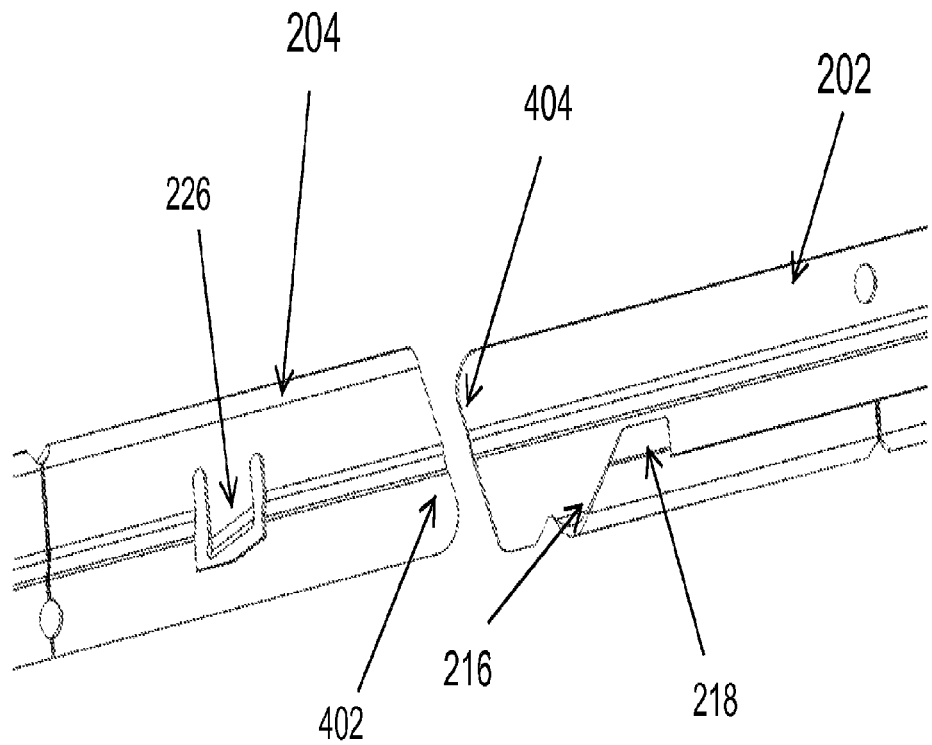
FIGS. 4A-4D illustrate views of the hanger bar assembly of FIG. 2 at various interlocking stages in accordance with an example embodiment.

FIGS. 4A-4D illustrate views of the hanger bar assembly 200 of FIG. 2 at various interlocking stages in accordance with an example embodiment. FIG. 4A illustrates the first hanger bar member 202 and the second hanger bar member 204 prior to being interlocked with each other. As shown in FIG. 4A, an end portion 402 is aligned with the channel 216 of first hanger bar member 202. An end portion 404 of the first hanger bar member 202 is similarly aligned with the channel 302 (shown in FIG. 4C) of the second hanger bar member 204. By extending beyond the stoppage tabs 218, 226, the end portions 402 and 404 aid in the alignment of the first hanger bar member 202 and the second hanger bar member 204.

Figure 4B:
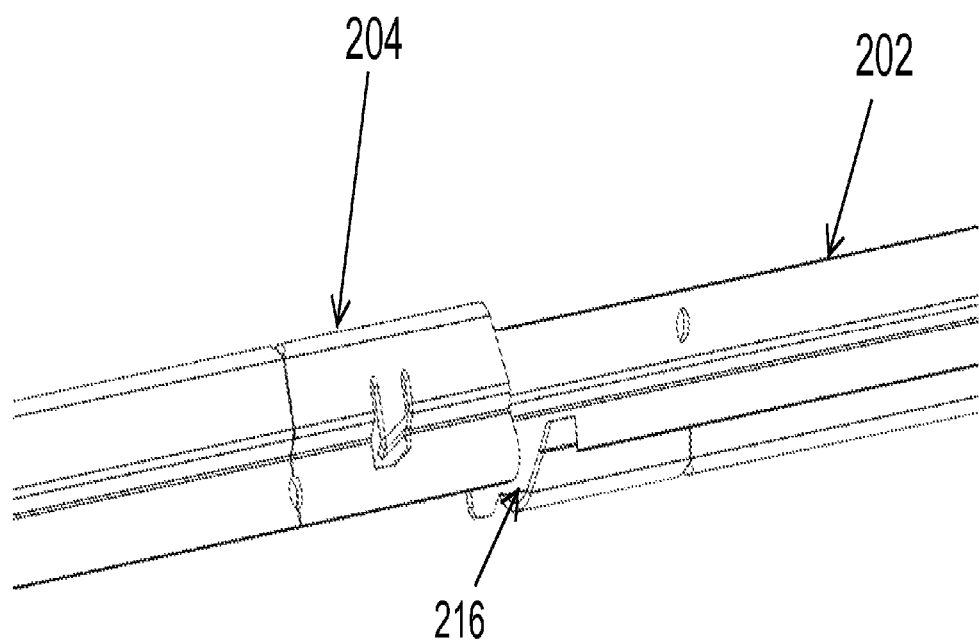
Figure 4C:
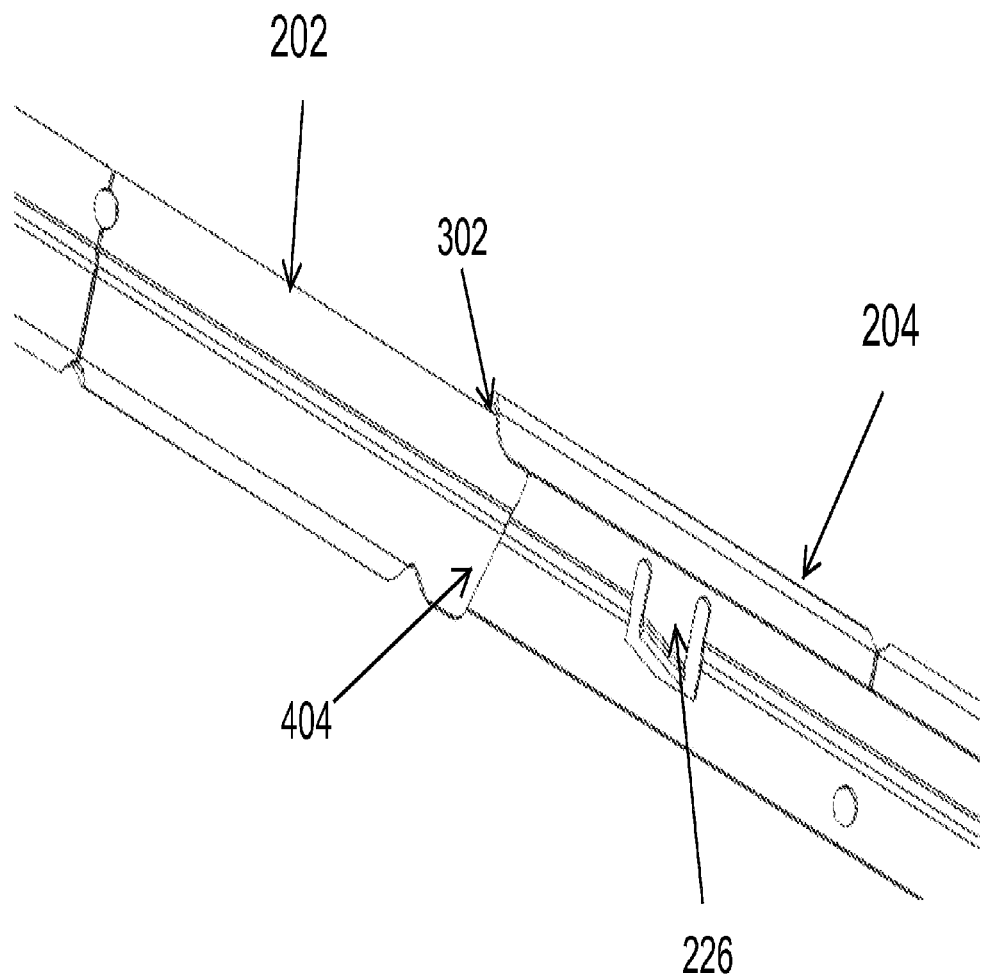
Figure 4D:
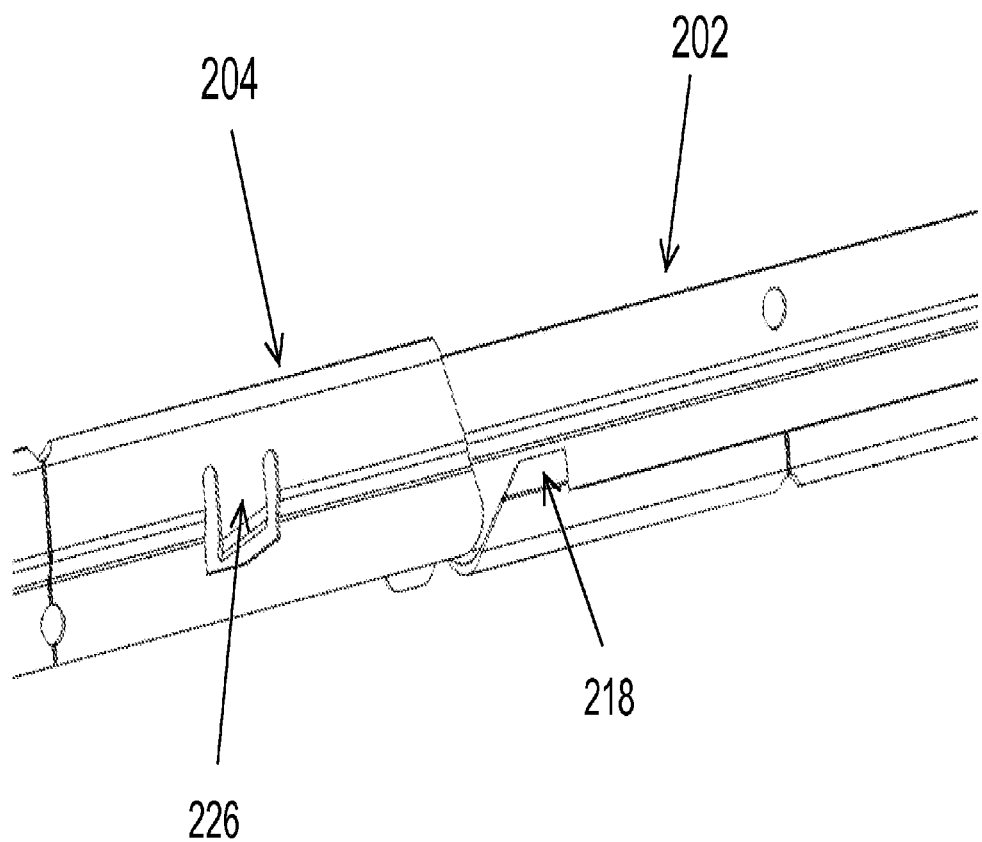

In contrast to FIG. 4A, in FIGS. 4B and 4C, the first hanger bar member 202 and the second hanger bar member 204 are in contact with each other. For example, as more clearly illustrated in FIG. 4C, the end portion 404 of the first hanger bar member 202 is already positioned in the channel 302 of the second hanger bar member 204. In FIG. 4D, the end portion 402 of the second hanger bar member 204 has moved closer to the channel 216 of the first hanger bar member 202 as compared to the position shown in FIG. 4B.

FIGS. 5A and 5B illustrate close-up views the stoppage tabs 218, 226 of the hanger bar assembly 200 of FIG. 2 in accordance with an example embodiment. The stoppage tab 218 and the stoppage tab 226 may be dimensioned such that the first hanger bar member 202 and the second hanger bar member 204 may be interlocked by sliding into each other's channel as described above while minimizing or preventing unintended disengagement/detachment of the first hanger bar member 202 and the second hanger bar member 204 from each other.

In a particular embodiment, the stoppage tab 218 extends out from an edge 502 of the channel segment 214 of the first hanger bar member 202. The stoppage tab 218 has a slanted edge 504 and a substantially straight edge 506. The stoppage tab 218 also has a third edge 514 between the slanted edge 504 and the substantially straight edge 506. The channel segment 214 of the first hanger bar member 202 has a slanted edge 518 that continues from the slanted edge 504 of the stoppage tab 218. The stoppage tab 218 may be integrally formed with the channel segment 214, or may be formed separately and attached to the channel segment 214 by means such as welding or a fastener.

In an example embodiment, the stoppage tab 226 extends out from a wall of the channel segment 224 of the second hanger bar member 204. For example, the stoppage tab 226 may be formed from a portion of the channel segment 224 and a portion of the transitional middle segment 222. Alternatively, the stoppage tab 226 may be attached to the channel segment by a means such as welding or a fastener. The stoppage tab 226 may have a substantially straight edge 510 and a slanted edge 508 forming a corner with the substantially straight edge 510. The stoppage tab 226 also has another edge 512 that is shorter than the substantially straight edge 510. The edge 512 forms a corner with the slanted edge 408 that is different from the common corner the slanted edge 408 forms with the substantially straight edge 510. Thus, the slanted edge 508 is slanted upwards as the slanted edge 508 extends from the substantially straight edge 510 toward the other edge 512.

When interlocking the first hanger bar member 202 and the second hanger bar member 204, the slanted edge 508 of the stoppage tab 226 may slide over the slanted edge 504 and over the third edge 514 of the stoppage tab 218. For example, the stoppage tab 226 may be pushed over the slanted edge 504 and over the third edge 514 of the stoppage tab 218. Alternatively, one or both of the stoppage tabs 218 and 226 may be pushed or pulled perpendicular to the longitudinal axis of the hanger bar assembly 200 while pushing one or both of the first hanger bar member 202 and the second hanger bar member 204 longitudinally towards each other to interlock the first hanger bar member 202 with the second hanger bar member 204.

Once the first hanger bar member 202 and the second hanger bar member 204 are interlocked such that the substantially straight edge 510 of the stoppage tab 226 is positioned adjacent to the substantially straight edge 506 of the stoppage tab 218, the stoppage tabs 218 and 226 may minimize and/or prevent unintended disengagement of the hanger bar members 202 and 204 from each other. As illustrated in FIG. 5A, the stoppage tabs 218 and 226 can abut against each other to prevent unintentional detachment of the hanger bar members 202 and 204 from each other. Once interlocked as shown in FIG. 5A, the hanger bar members 202 and 204 can be moved longitudinally relative to each other to adjust the length of the hanger bar member 200 as shown in FIG. 5B. To intentionally disengage/detach the first hanger bar member 202 and the second hanger bar member 204 from each other, one or both of the tabs 218 and 226 may be pushed or pulled slightly perpendicular to the longitudinal axis of the hanger bar assembly 200 while pulling one or both of the first hanger bar member 202 and the second hanger bar member 204 away from one another. Although stoppage tabs 218 and 226 are described as a means for minimizing or preventing unintended disengagement of the hanger bar members 202 and 204 from each other, in alternative embodiments, other structures and/or methods may be used to minimize and/or prevent unintended disengagement of the hanger bar members 202 and 204.

FIG. 5C illustrates a close-up view of the stoppage tabs 218, 226 of the hanger bar assembly 200 of FIG. 2 in accordance with another example embodiment. In some example embodiments, the first hanger bar member 202 may include an extended end portion 530 that extends beyond the stoppage tab 218. In contrast to the slanted edge 518 that extends from the slanted edge 504 of the stoppage tab 218 shown in FIGS. 5A and 5B, the extended end portion 530 is a portion of the channel 216 shown in FIG. 2.

Figure 6A:
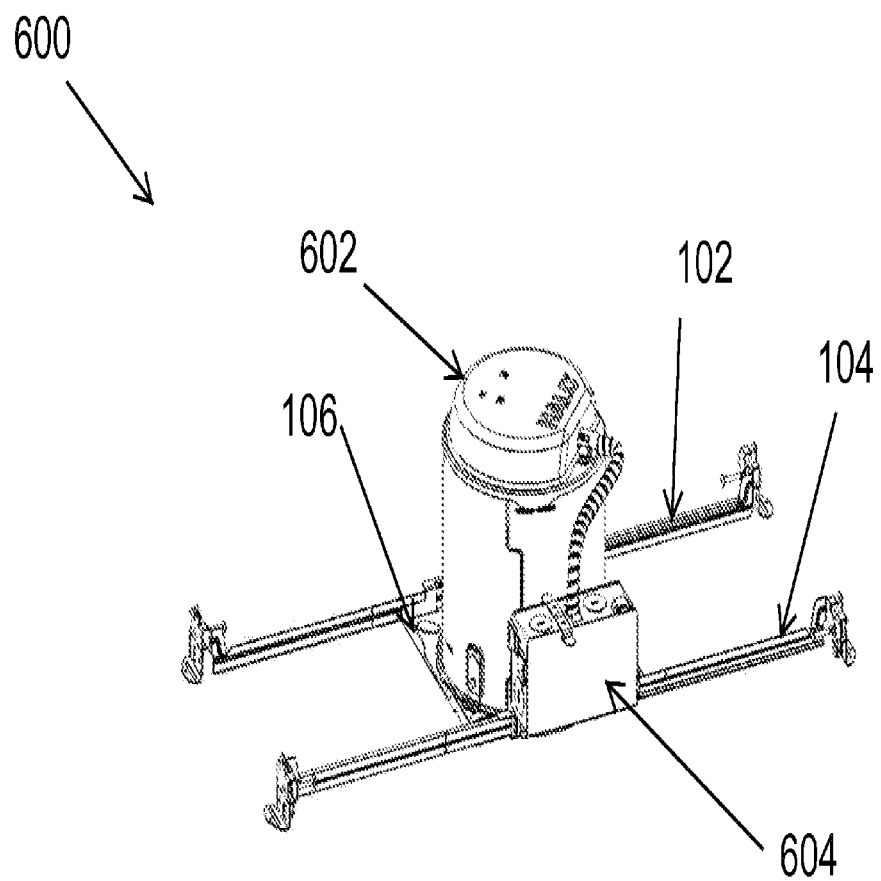
FIGS. 6A-6C illustrate a luminaire structure including the hanger bar assemblies of FIG. 1 adjusted in length for use with different support structures in accordance with example embodiments.
Figure 6B:
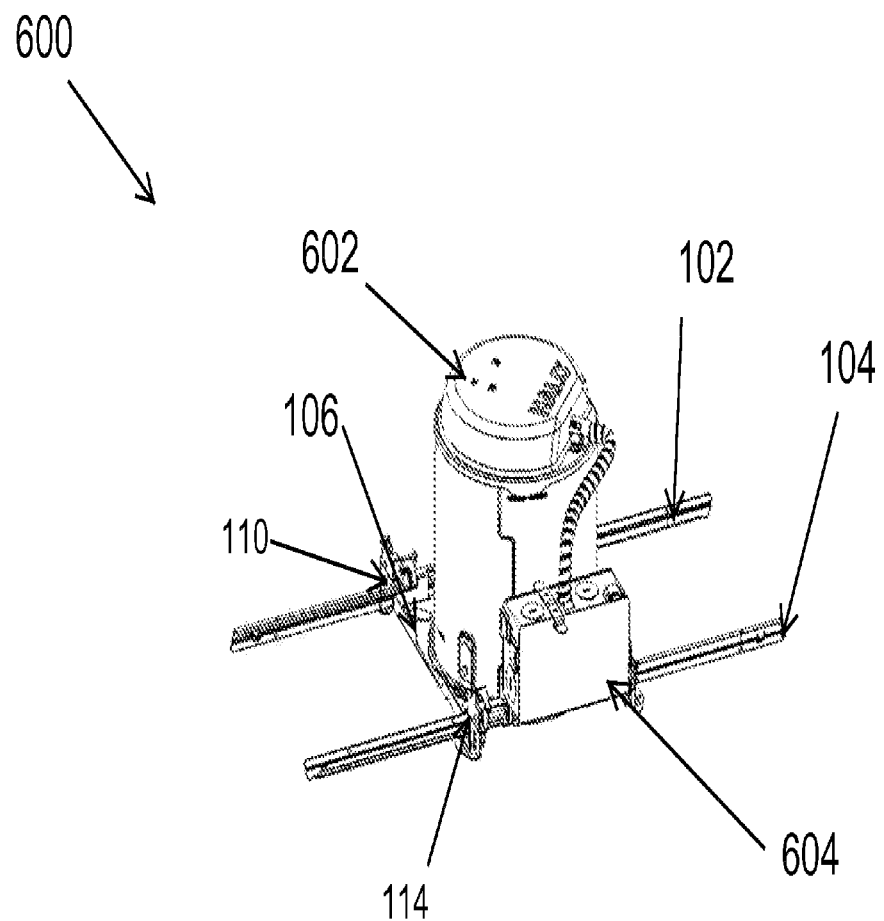
Figure 6C:
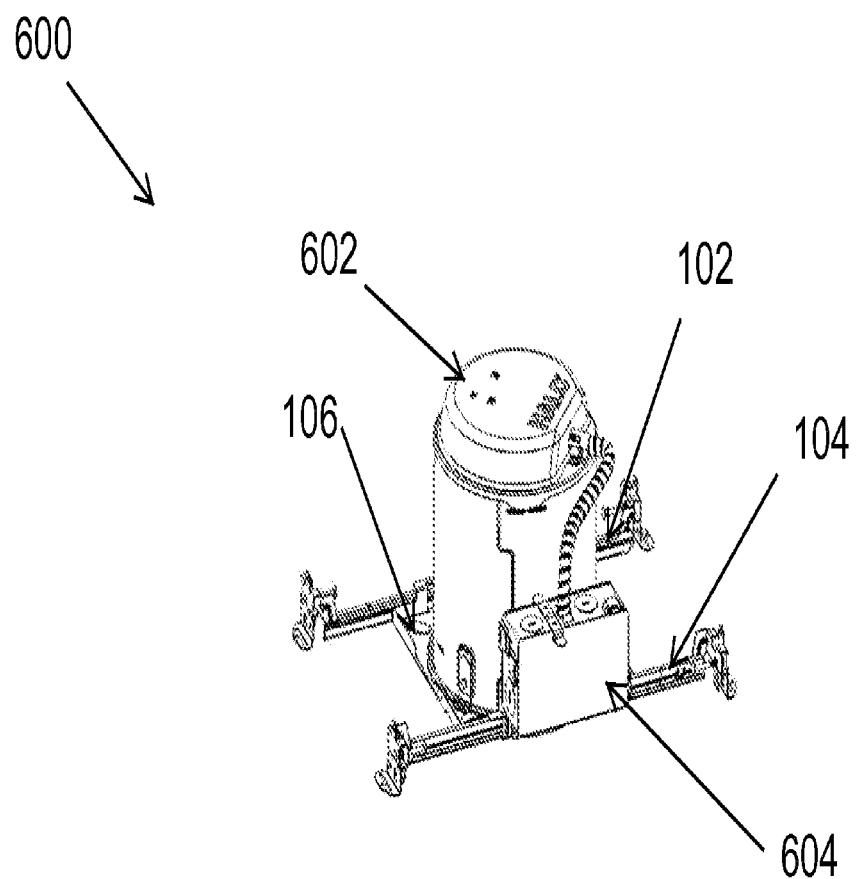

FIGS. 6A-C illustrate a luminaire structure 600 including the hanger bar assemblies 102 and 104 of FIG. 1 adjusted in length for use with different support structures in accordance with example embodiments. As indicated above, each of the hanger bar assemblies 102 and 104 corresponds to the hanger bar assembly 200 described above. In a particular embodiment, the hanger bar assemblies 102 and 104 correspond to the hanger bar assembly 200 of FIGS. 2-4. FIG. 6A illustrates the hanger bar assemblies 102 and 104 in a fully extended position. For example, when the hanger bar assemblies 102 and 104 are in a fully extended position, the stoppage tabs 218 and 226 of each hanger bar assembly 102 and 104 may be in contact with each other in a manner shown in FIG. 4.

FIG. 6B illustrates the hanger bar assemblies 102 and 104 in a fully retracted position. As illustrated in FIG. 6B, each hanger bar member of the first hanger bar assembly 102 may extend beyond the attachment structure 110, 112 (more clearly shown in FIG. 1) attached to the other mating hanger bar member of the hanger bar assembly 102. Similarly, each hanger bar member of the second hanger bar assembly 104 may extend beyond the attachment structure 114, 116 (more clearly shown in FIG. 1) attached to the other mating hanger bar member of the second hanger bar assembly 104. In some example embodiments, the portions of the hanger bar members of the hanger bars assemblies 102, 104 shown as extending beyond the respective attachment structures 110, 112, 114, 116 may be bent, broken off, or cut off (for example, along the score line 230 shown in FIG. 2) for attachment to a support/installation structure such as joists.

FIG. 6C illustrates the hanger bar assemblies 102 and 104 in a position between the fully extended position shown in FIG. 6A and the fully retracted position shown in FIG. 6B. As illustrated in FIGS. 6A-C, each of the hanger bar assemblies 102 and 104 may be adjusted for use with support structures that have various spacing between them corresponding to a range between the fully extended positions of the hanger bar assemblies 102, 104 shown in FIG. 6A and the fully retracted positions shown in FIG. 6B. For example, the hanger bar assemblies 102 and 104 may be adjusted in length for use with support structures that are between 12 inches and 24 inches apart. In some example embodiments, the hanger bar assemblies 102 and 104 may be adjusted to less than 12 inches and/or to greater than 24 inches. As illustrated in FIGS. 6A-6C, the hanger bar assemblies 102 and 104 can support a luminaire housing 602 that is positioned on the plaster frame 106 along with other fixture components, such as the junction box 604 and one or more light sources that may be positioned in the luminaire housing 602.

Figure 7A:
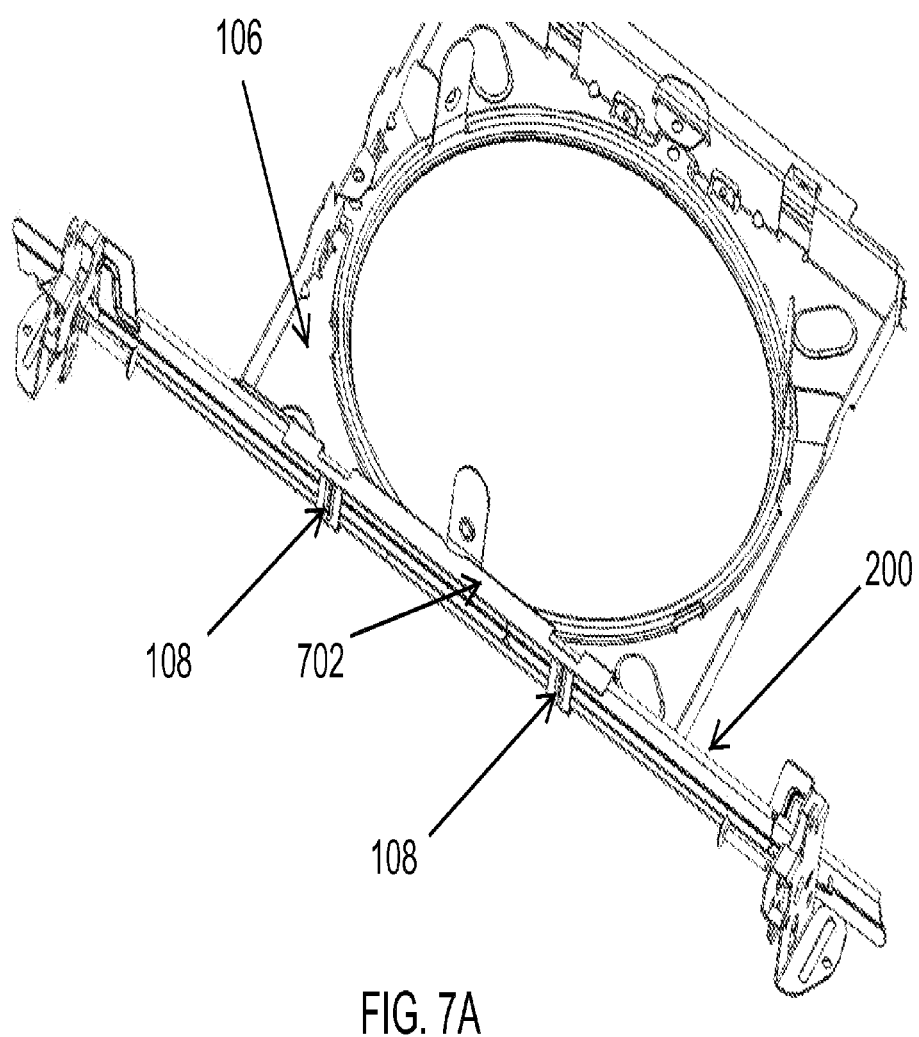
FIGS. 7A-7E illustrate various views of attachment tabs of a plaster frame for securing the hanger bar assembly of FIG. 2 to the plaster frame in accordance with an example embodiment.
Figure 7B:
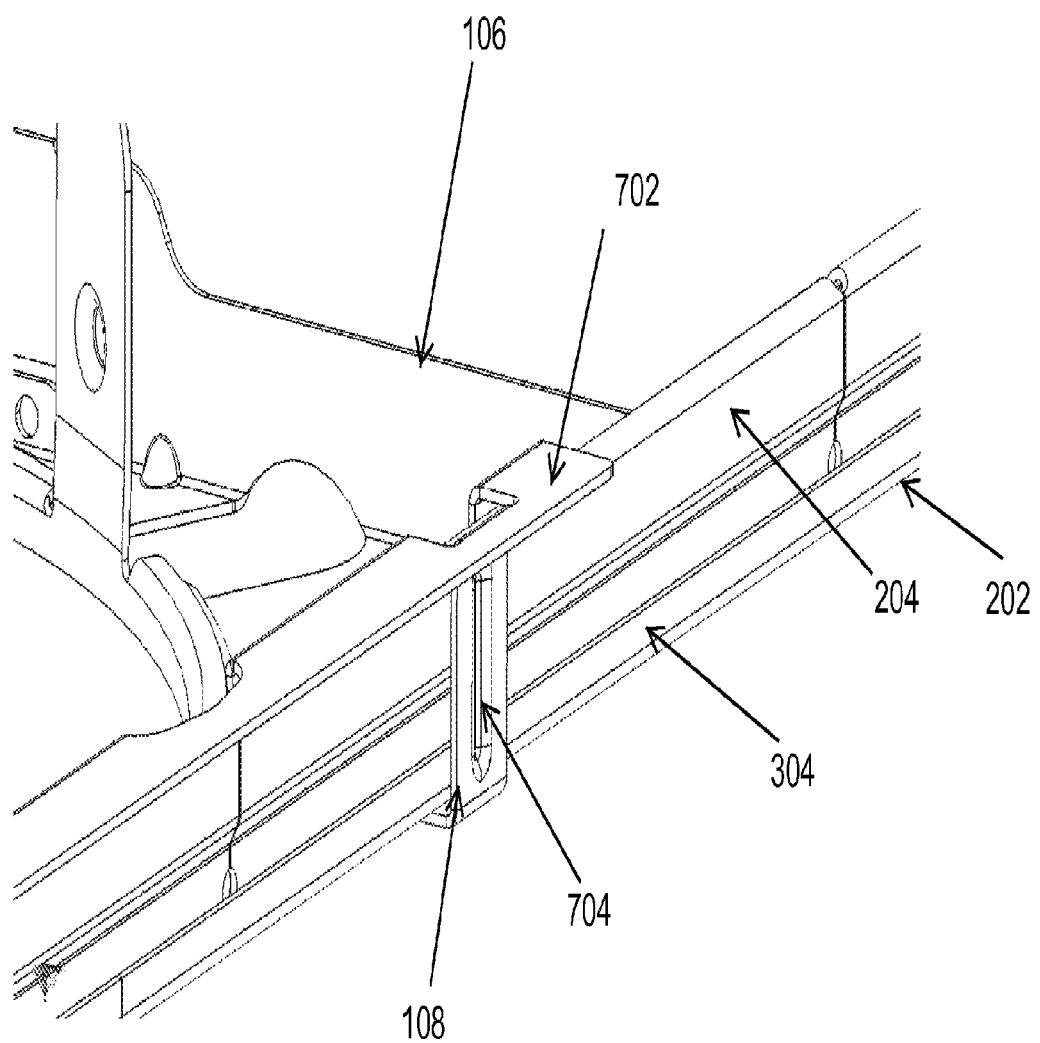
Figure 7C:
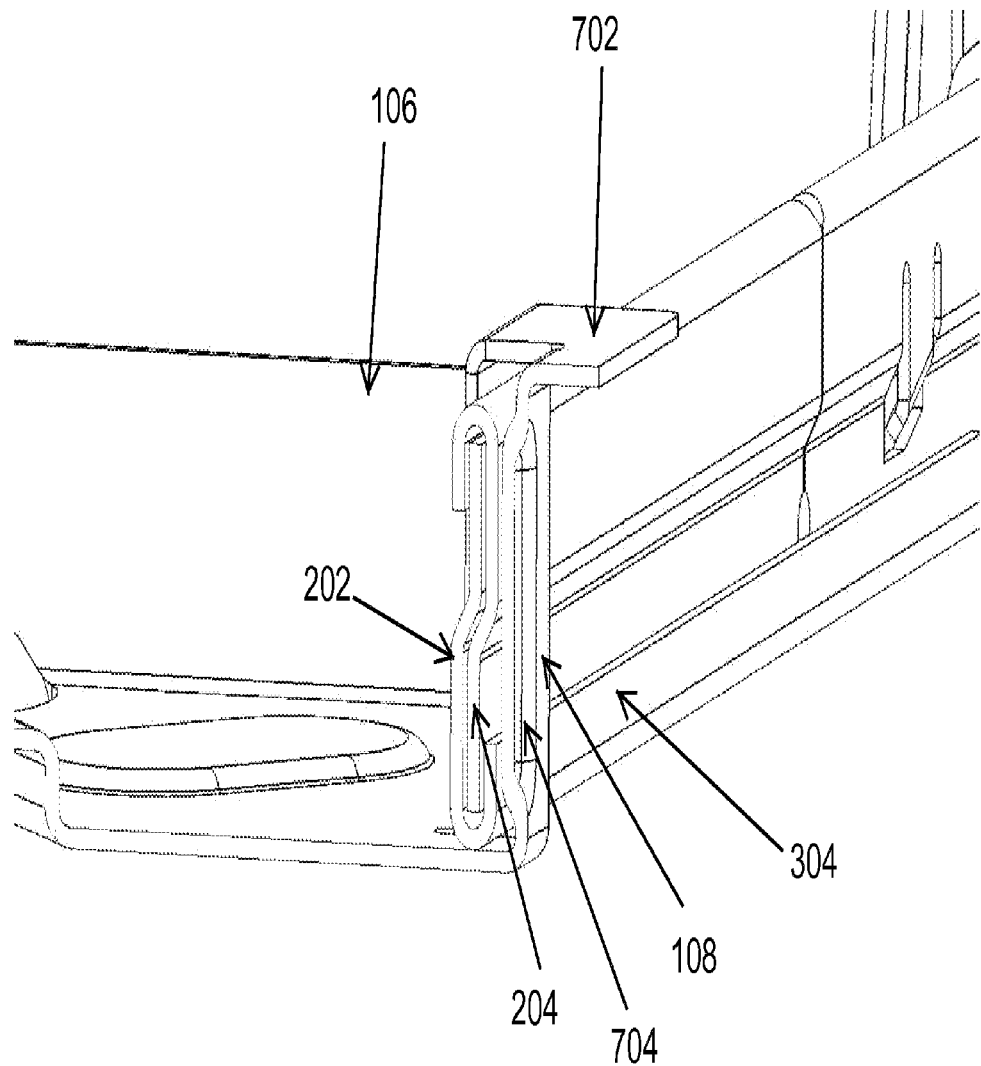

FIGS. 7A-7E illustrate various views of attachment tabs of the plaster frame 106 for securing the hanger bar assembly of FIG. 2 to the plaster frame 106 in accordance with an example embodiment. As illustrated in FIGS. 7A-7C, the hanger bar assembly 200 is attached to the plaster frame 106 by the attachment tabs 108. In some example embodiments, the attachment tabs 108 may formed from portions of the plaster frame 106 including an edge portion 702 of the plaster frame 106. Alternatively, the attachment tabs 108 may be attached to the plaster frame 106 by means such as soldering.

In some example embodiments, the attachment tabs 108 include a rib 704, as more clearly shown in FIGS. 7B and 7C. For example, the rib 704 may be formed in the attachment tab 108 by methods such as pressing. As the length of the hanger bar member 200 is adjusted, the rib 704 can reduce the contact surface area between the attachment tab 108 and the hanger bar assembly 200. To illustrate, because the rib 704 extends toward the wall 304 of the first hanger bar member 202, the rib 704 may be in contact with only the surface of the wall 304 of the first hanger bar member 202. During installation of a luminaire structure (e.g., the luminaire structure 600 of FIG. 6A) to structures such as joists, the rib 704 of each attachment tab 108 guides the hanger bar members 202, 204 away from an outer wall 712 of the attachment tabs 108 and through the attachment tabs 108 as the length of the hanger bar members assembly 200 is adjusted by slidably moving one or both of the hanger bar members 202, 204.

Figure 7D:
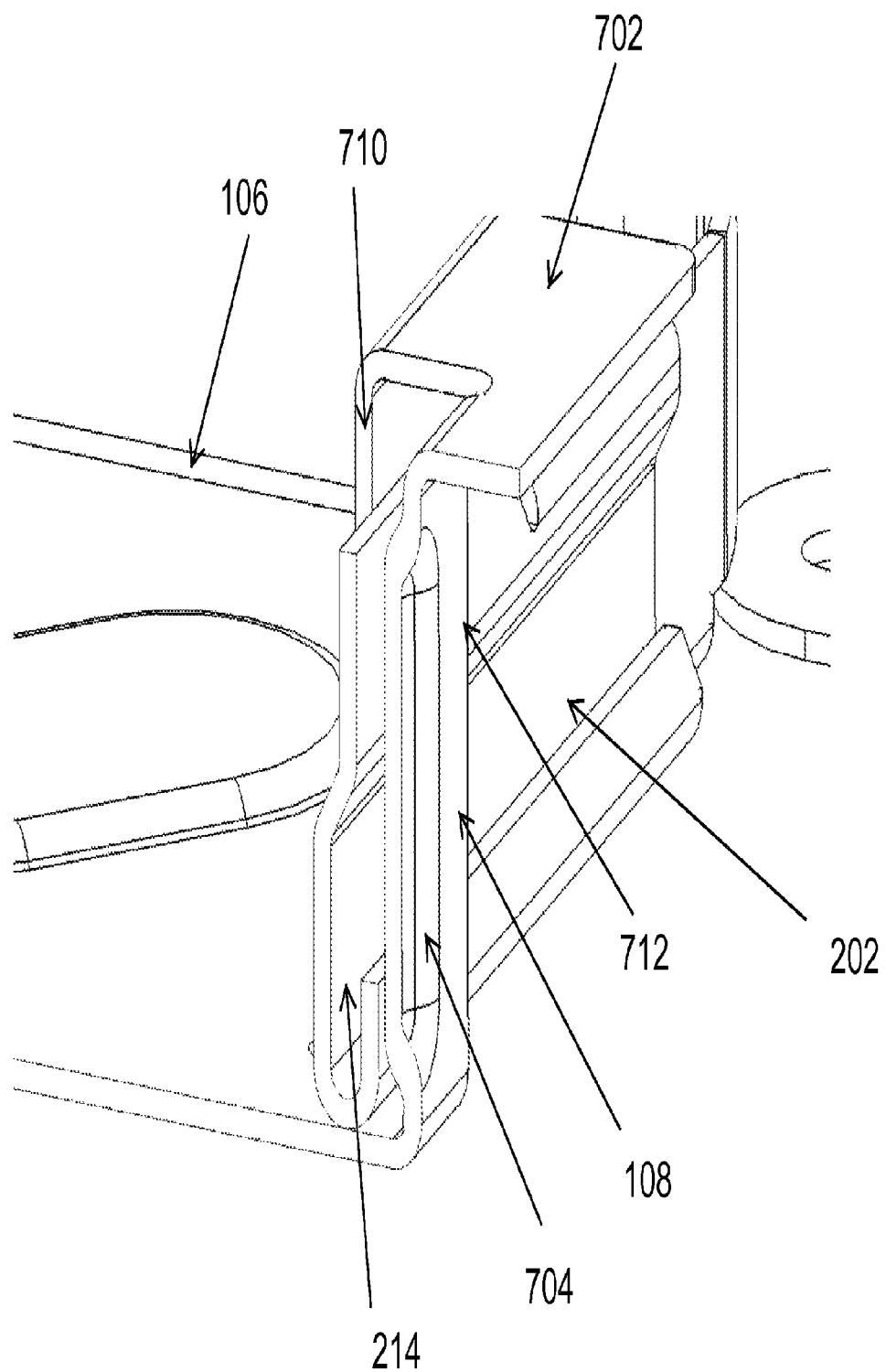
Figure 7E:
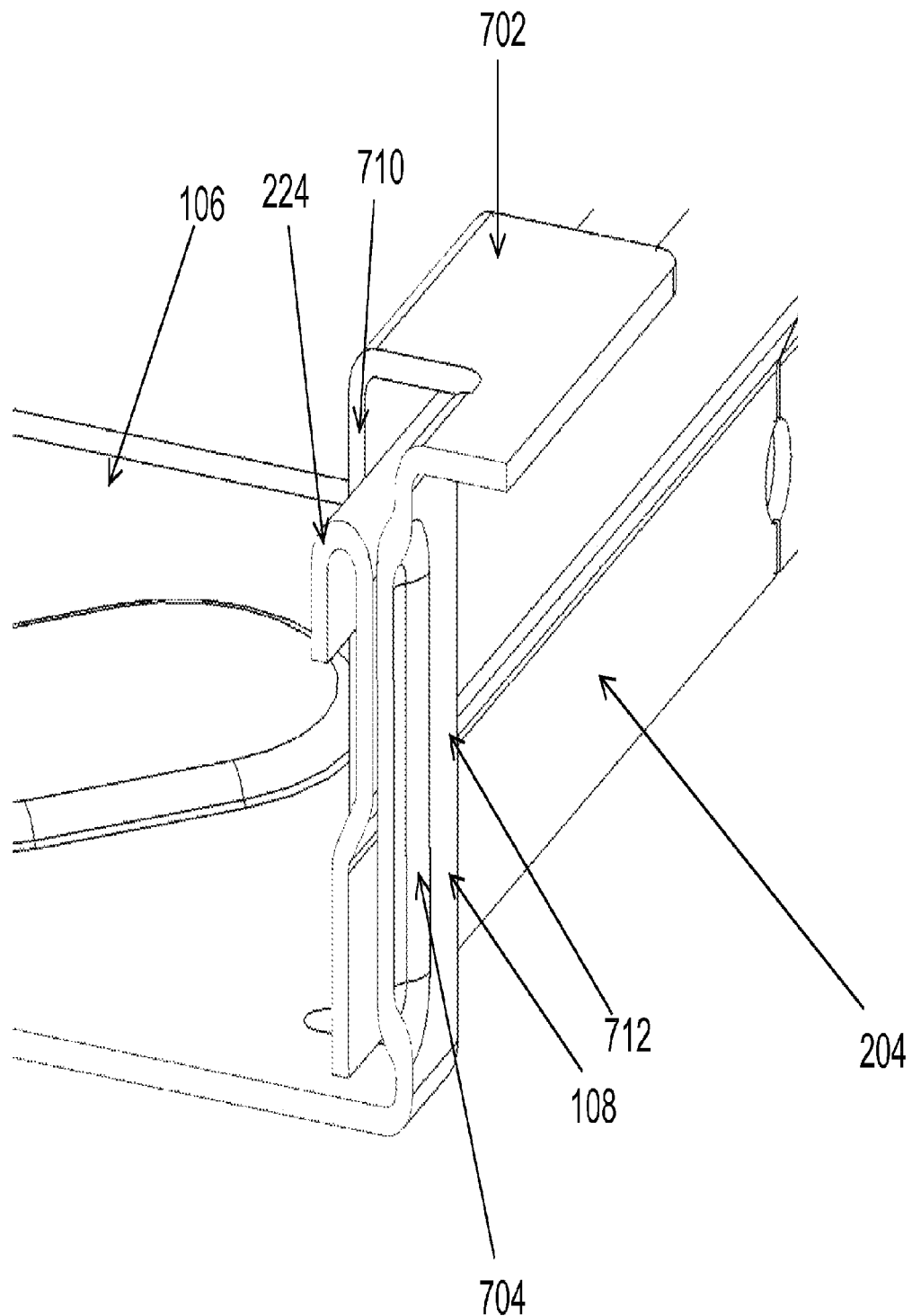

When the hanger bar assemblies 102, 104 are fully or substantially extended (e.g., luminaire structure 600 of FIG. 6A), only one of the two hanger bar members 202, 204 may be positioned in a particular attachment tab 108 as illustrated in FIGS. 7D and 7E. For example, as illustrated in FIG. 7D, when the first hanger bar member 202 is positioned in the particular attachment tab 108, the channel segment 214 of the hanger bar member 202 may be in physical contact with or very close to the rib 704 of the respective attachment tab 108 and a back wall 710 of plaster frame 106. Similarly, as illustrated in FIG. 7E, when the second hanger bar member 204 is positioned in the particular attachment tab 108, the channel segment 224 of the hanger bar member 204 may be in physical contact with or very close to the rib 704 of the respective attachment tab 108 and the back wall 710. Because the channel segments 214, 224 of the hanger bar members 202, 204 may be in physical contact with or very close to the rib 704 of the respective attachment tabs 108 and the back wall 710, lateral movements of hanger bar members 202, 204 within the respective attachment tab 108 (i.e., toward and way from the rib 704 and the back wall 710) are significantly limited. Such limitation on the lateral movement of the hanger bar members 202, 204 results in the stability of the installed luminaire structure, such as the luminaire structure 600 of FIG. 6A.

Although the attachment tabs 108 are shown as having a particular shape, in some alternative embodiments, the attachment tabs 108 may have other shapes without departing from the scope of this disclosure. For example, the attachment tabs 108 may have more than one rib 704.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A hanger bar assembly, comprising:
a first hanger bar member comprising:
a first rail segment;
a first channel segment including a first channel; and
a first transitional middle segment extending between the first rail segment and the first channel segment, wherein the first rail segment and the first channel segment are horizontally offset from each other; and
a second hanger bar member comprising:
a second rail segment;
a second channel segment including a second channel; and
a second transitional middle segment extending between the second rail segment and the second channel segment, wherein the second rail segment and the second channel segment are horizontally offset from each other, wherein a longitudinal edge of the first rail segment is positioned within the second channel proximal to an inner bottom portion of the second channel, and wherein a longitudinal edge of the second rail segment is positioned within the first channel proximal to an inner top portion of the first channel.

2. The hanger bar assembly of claim 1, wherein the first rail segment of the first hanger bar member is slidably movable in the second channel and wherein the second rail segment of the second hanger bar is slidably movable in the first channel.

3. The hanger bar assembly of claim 2, wherein a length of the hanger bar assembly is adjustable by slidably moving the first hanger bar member or the second hanger bar member.

4. The hanger bar assembly of claim 1, further comprising:
a first attachment structure coupled to the first hanger bar member at an end of the first hanger bar member; and
a second attachment structure coupled to the second hanger bar member at an end of the second hanger bar member, wherein the first attachment structure and the second attachment structure are used to attach the hanger bar assembly to support structures.

5. The hanger bar assembly of claim 4, wherein the first attachment structure includes a first gap, wherein the second attachment structure includes a second gap, wherein the second hanger bar member is slidable through the first gap, and wherein the first hanger bar member is slidable through the second gap.

6. The hanger bar assembly of claim 1, further comprising:
a first stoppage tab extending out from an edge of the first channel segment; and
a second stoppage tab extending out from the second channel segment toward the edge of the first channel segment, wherein the first stoppage tab and the second stoppage tab prevent unintended disengagement of the first hanger bar member from the second hanger bar member.

7. The hanger bar assembly of claim 6, wherein the first stoppage tab extends up from the edge of the first channel segment and wherein the second stoppage tab extends down toward the edge of the first channel segment and wherein the first stoppage tab and the second stoppage tab abut against each other to prevent unintended disengagement of the first hanger bar member from the second hanger bar member.

8. The hanger bar assembly of claim 1, wherein the transitional middle segment is slanted, curved, or substantially horizontal.

9. A hanger bar assembly, comprising:
a first hanger bar member comprising:
a first rail segment;
a first channel segment including a first channel; and
a first transitional middle segment extending between the first rail segment and the first channel segment, wherein the first rail segment and the first channel segment are offset from each other with respect to a horizontal axis; and
a second hanger bar member comprising:
a second rail segment;
a second channel segment including a second channel; and
a second transitional middle segment extending between the second rail segment and the second channel segment, wherein the second rail segment and the second channel segment are offset from each other with respect to the horizontal axis, wherein a longitudinal edge of the first rail segment is positioned within the second channel proximal to an inner bottom portion of the second channel, and wherein a longitudinal edge of the second rail segment is positioned within the first channel proximal to an inner top portion of the first channel.

10. The hanger bar assembly of claim 9, wherein the first hanger bar member and the second hanger bar member are interlocked with each other by slidably moving the first rail segment of the first hanger member in the second channel of the second hanger bar member and by slidably moving the second rail segment of the second hanger member in the first channel of the first hanger bar member.

11. The hanger bar assembly of claim 9, further comprising:
a first attachment structure coupled to the first hanger bar member at an end of the first hanger bar member; and
a second attachment structure coupled to the second hanger bar member at an end of the second hanger bar member, wherein the first attachment structure and the second attachment structure are used to attach the hanger bar assembly to support structures.

12. The hanger bar assembly of claim 11, wherein the first attachment structure includes a first gap, wherein the second attachment structure includes a second gap, wherein the second hanger bar member is slidable through the first gap, and wherein the first hanger bar member is slidable through the second gap.

13. The hanger bar assembly of claim 9, wherein the first hanger bar member and the second hanger bar member are formed from sheet metal.

14. The hanger bar assembly of claim 9, further comprising:
a first stoppage tab extending out from an edge of the first channel segment; and
a second stoppage tab extending out from the second channel segment toward the edge of the first channel segment, wherein the first stoppage tab and the second stoppage tab prevent unintended disengagement of the first hanger bar member from the second hanger bar member.

15. A luminaire mounting structure for mounting a recessed luminaire, the luminaire mounting structure comprising:
a hanger bar assembly;
a plaster frame, wherein the hanger bar assembly is attached to the plaster frame on a first side of the plaster frame, wherein the hanger bar assembly comprises a first hanger bar member and a second hanger bar member, wherein the first hanger bar member comprises:

a first rail segment;

a first channel segment including a first channel; and a first transitional middle segment extending between the first rail segment and the first channel segment, wherein the first rail segment and the first channel segment are horizontally offset from each other; and wherein the second hanger bar member comprises:

a second rail segment;

a second channel segment including a second channel; and a second transitional middle segment extending between the second rail segment and the second channel segment, wherein the second rail segment and the second channel segment are horizontally offset from each other, wherein a longitudinal edge of the first rail segment is positioned within the second channel proximal to an inner bottom portion of the second channel, and wherein a longitudinal edge of the second rail segment is positioned within the first channel proximal to an inner top portion of the first channel.

16. The luminaire mounting structure of claim 15, wherein a length of the hanger bar assembly is adjustable by slidably moving the first hanger bar member or the second hanger bar member.

17. The luminaire mounting structure of claim 15, wherein the plaster frame comprises an attachment tab and wherein the hanger bar assembly is inserted through a space between the attachment tab and a wall of the plaster frame.

18. The luminaire mounting structure of claim 17, wherein the attachment tab includes a rib extending toward the wall of the plaster frame, wherein the rib is shaped to guide the first hanger bar member toward the space between the attachment tab and the wall of the plaster frame during an insertion of the first hanger bar member through the space between the attachment tab and the wall of the plaster frame.

19. The luminaire mounting structure of claim 15, wherein the plaster frame is designed to receive a luminaire can.

20. The luminaire mounting structure of claim 15, further comprising a second hanger bar assembly, wherein the second hanger bar assembly is attached to the plaster frame on a second side of the plaster frame opposite the first side.

* * * * *